Dec. 17, 1935.  L. W. WYCKOFF  2,024,194
MEANS FOR CORRECTING OCULAR DEFECTS
Filed June 20, 1932
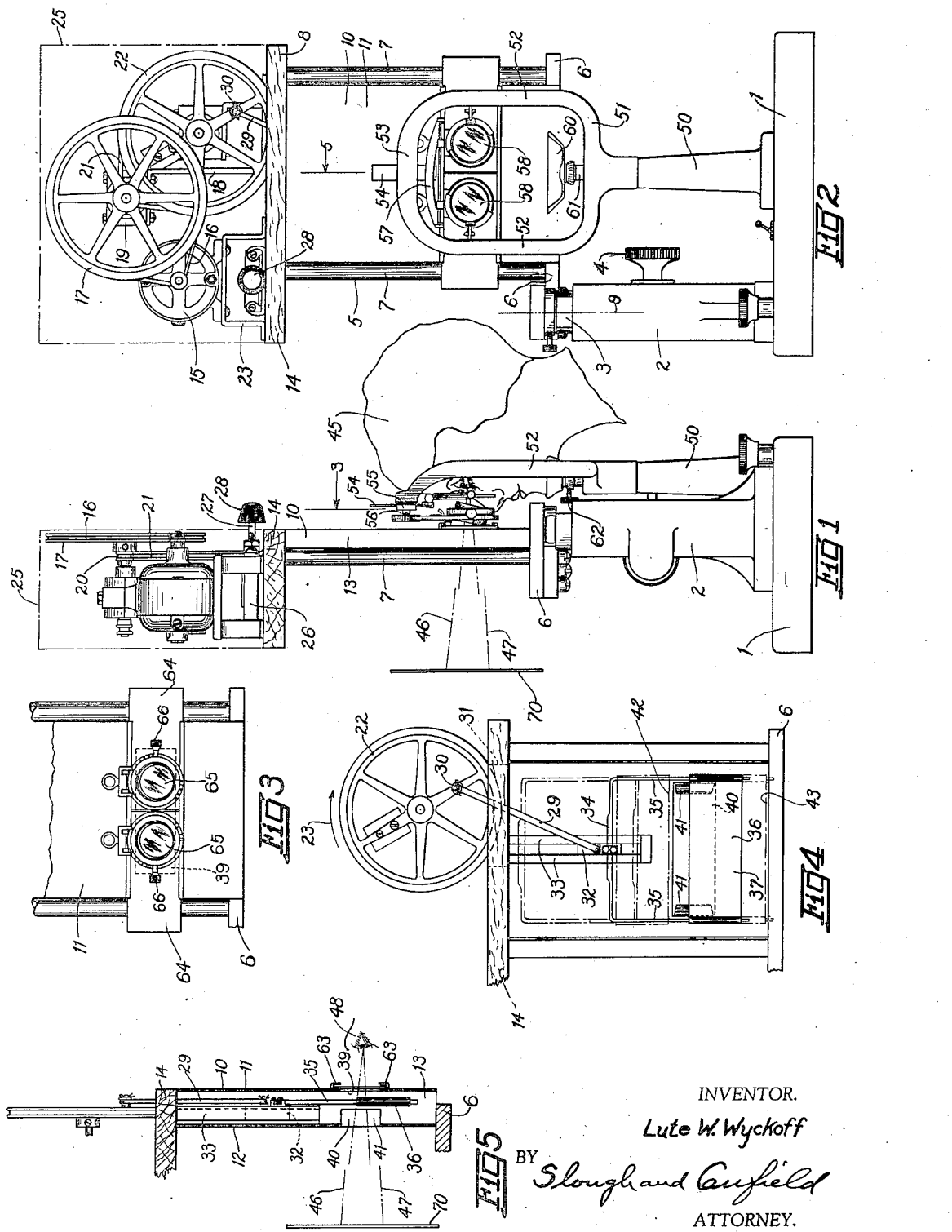
INVENTOR.
*Lute W. Wyckoff*
BY *Slough and Canfield*
ATTORNEY.

Patented Dec. 17, 1935

2,024,194

UNITED STATES PATENT OFFICE 2,024,194

MEANS FOR CORRECTING OCULAR DEFECTS

Lute W. Wyckoff, Chagrin Falls, Ohio

Application June 20, 1932, Serial No. 618,141

6 Claims. (Cl. 88—20)

This invention relates to means for correcting ocular defects, and particularly to means for correcting ocular defects by effecting physiological corrective changes in the eyes themselves.

Heretofore, and particularly in more recent years, various types of apparatus have been devised by the use of which a patient having ocular defects may "exercise" his eyes on the theory that to do so may strengthen certain eye muscles, etc., and thus correct or partially correct the defects in the eyes themselves, as distinguished from the older practice of relying upon supplemental corrective "eyes" in the form of spectacles. Such prior apparatus and methods have had only a relatively small measure of success.

Investigations and experiments which I have conducted lead me to believe that ocular defects of the kind which can be corrected by a corrective physiological change in the eye itself are defects which are due to unconscious faulty "brain habits"; and that to effect desired correction of these defects, the faulty brain habits must be broken up and new and proper habits substituted therefor.

The effort of the brain to effect vision through a defective eye is an unconscious effort and therefore is not subject to rational control or development, such for example as are the efforts to walk or run, and thus the defective eye is not little by little correctively developed from birth. The brain, early in the history of a patient having a defective eye, forms the habit of continuous uninterrupted irrational effort tending to compensate for the defect. Such continuous effort or strain in the eyes, as distinguished from the alternate rest and effort of rationally controlled parts of the human body, results in what may be called a partial paralysis or paresis of the ciliary muscles; and beyond a slight tendency to correction, little cumulative or permanent correction ever results.

In the practice of my invention which is the subject matter of this application, the method and means of correcting ocular defects functions in a manner to oppose or antagonize the brain in its effort to accomplish vision through the defective eyes and thus breaks up the old eye habit and causes new habits to form. This opposition or antagonism is effected periodically by a method and means whereby the corrective effort of the eye is broken up into successive alternate periods of effort and rest; that is to say, the eye effort is rationally controlled, and as a consequence, a gradual cumulative permanent "strengthening" and other corrective effects are produced.

As will appear hereinafter, the alternate periodic efforts to which the eye is subjected are made under external optical compensative conditions imposed upon the eye according to the particular defects to be corrected.

It is therefore an object of my invention to provide an improved means for correcting ocular defects by effecting improved physiological conditions in the eyes themselves.

Another object of my invention is to provide an improved means for correcting ocular defects by causing changes in the brain habits which effect vision through the eyes.

Another object is to provide an improved means for correcting ocular defects by subjecting the eyes to successive periods of alternate effort and rest.

Another object is to provide means for correcting ocular defects by subjecting the eyes to successive periods of alternate effort and rest under externally imposed optical conditions predetermined in accordance with the specific ocular defects to be corrected.

Other objects will be apparent to those skilled in the art to which my invention appertains.

My invention is fully disclosed in the following description taken in connection with the accompanying drawing, in which:

Fig. 1 is a side elevational view of an apparatus whereby my invention may be practiced;

Fig. 2 is a front elevational view of the apparatus of Fig. 1;

Fig. 3 is a fragmentary view taken approximately from the plane 3 of Fig. 1;

Fig. 4 is a fragmentary view similar to a part of Fig. 2 and with a cover element which I may employ removed to reveal an internal mechanism;

Fig. 5 is a fragmentary view taken approximately from the plane 5 of Fig. 2;

Referring to the drawing, I have shown at 1 a base and at 2 a column thereon in which is telescopically fitted a stem 3 vertically adjustably slidable therein and adapted to be fixed in any vertically adjusted position by a hand screw 4 in any suitable or well known manner.

Upon the stem 3 is supported a frame, indicated generally at 5, and comprising a base 6, a pair of laterally spaced side members 7—7, generally vertically disposed, and a housing 8 supported upon the upper ends of the frame members 7—7.

The frame in its entirety is thus vertically adjustable on the column 2 and furthermore, may be adjustably swung in horizontal planes around the axis 9 of the column 2, to this end the stem 3 being preferably made cylindrical and fitted in a cylindrical bore of the column 2.

Between the housing 8 and the base 6, and between the members 7—7, a box-like construction is provided shown generally at 10, and comprising front and rear walls 11 and 12, see Fig. 5, and side walls 13—13.

The housing 8 comprises a base 14 upon which is mounted an electric motor 15 belted as at 16 to a relatively large wheel 17 rotatably supported on a suitable frame indicated at 18—19 and connected to a small pulley or wheel 20, Fig. 1, which in turn is belted as at 21 to a relatively large wheel 22 rotatably supported on the frame 18—19. The frame 18—19 and a frame 23 supporting the motor 15 are mounted upon the base 14.

The apparatus just described mounted on the base 14 may be enclosed within a sheet metal housing cover which is not shown in the drawing for purposes of simplicity, but a suitable position and shape of which is indicated at 25, Figs. 1 and 2.

By this construction, the wheel 22 may be caused to rotate relatively slowly by a motor 15 of commercial type and construction, and at 26 is indicated generally an electric control device by which the speed of the motor 15 may be varied over a range of speeds. The device 26 may be of any suitable or known, preferably commercial form, operable by turning a control shaft 27 by means of a dial button 28. In view of the development of the art of small motor control, it is not believed necessary to further illustrate or describe the motor 15 or its controller 26 or the connections thereof, these elements and functions being believed to be clearly understood by those skilled in this art; and furthermore, these parts constitute no essential part of my invention.

Connected to the wheel 22 is a pitman rod or connecting rod 29, one end of which has a bearing connection with the wheel as at 30. The rod 29 extends through a suitable aperture 31 in the base 14 and at its opposite or lower end, is connected to a head 32, vertically reciprocably guided in a pair of guides 33—33 of well known construction.

Connected to the head 32 also is a bail having a horizontal transverse portion 34 and lateral depending portions 35—35 to the lower end of which is connected a transverse binder 36 formed preferably from sheet metal of substantial vertical dimension and at its opposite transverse ends being preferably bent around the preferably wire-form portions 35 of the bail and with the intermediate portion 37 disposed substantially in a vertical plane.

By the construction just described, upon rotation of the wheel 22, preferably in the direction of the arrow 23 of Fig. 4, the head 32 will reciprocate in the guides 33 and correspondingly reciprocate the blinder 36.

In the front wall 11 of the box 10 is provided a horizontally elongated preferably rectangular aperture 39, Figs. 3 and 5, and in the opposite or rear wall 12 is provided a similar aligned aperture 40. (See also Fig. 4.) The aperture 40 may have inwardly extending side wings 41—41 at the opposite terminations of the aperture if desired.

The aligned apertures 39 and 40 are preferably disposed in the walls of the box 10 with relation to the movement of the blinder 36 so that the blinder may move upwardly to a position indicated generally at 42 to entirely clear the aligned apertures and may move downwardly to obstruct the apertures and continue on to a lower position, indicated at 43, to entirely again clear the apertures and then return over the same path, again obstructing the apertures on its upward movement.

As will presently appear, the aligned apertures 39 and 40 are adapted to be placed in the line of vision of a patient and thus during the rotation of the wheel 22, the blinder periodically cuts off the line of vision, twice for each revolution of the wheel 22, once on the down stroke of the slide 32 and once on the up stroke.

In Fig. 1 at 45 generally is indicated the head of the patient positioned in connection with apparatus to be referred to and described; and when in this position, the line of vision of the patient is indicated by the lines 46 and 47 defining the visual angle in a vertical plane. In Fig. 5 these lines have been reproduced as has also the patient's eye 48 to illustrate that the apertures 39 and 40 are in the line of vision and that the line of vision may be interrupted periodically by the blinder 36.

The base 1 has rising therefrom a pedestal 50 upon the upper end of which is a loop-form frame 51, the vertical side reaches 52—52 of which are spaced laterally apart sufficiently to receive therebetween the head or face of a patient as illustrated in Fig. 1.

The upper reach 53 of the frame 51 is provided with a vertical guideway 55 in which is vertically slidably adjustable a hanger 54 adapted to be fixed in any adjusted position by a screw 56. On the lower end of the hanger 54 is mounted a "spectacle" frame 57 of the type and construction well known to optometrists and oculists and in which may be removably mounted and adjustably positioned lenses 58—58.

The spectacle frame 57 and the lenses 58 thereof constitute no essential part of my invention as far as the construction thereof is concerned and may be of any known or suitable construction. A preferred construction embodies means to adjustably shift the lenses 58 laterally to accommodate them to the spacing of the patient's eyes and the mounting for the lenses 58 may comprise means for rotating them around their axes or otherwise adjustably shifting them for purposes to be described.

It is desired that the patient, when his head is in the position indicated in Fig. 1, have his horizontal line of vision directly through the aligned apertures 39 and 40 and therefore, to so position his head, a chin rest 60 is provided supported upon the pedestal 50 by means of a preferably cylindrical stem 61 telescoped into the pedestal and vertically and rotatively adjustable therein and adapted to be fixed in any adjustment by a set screw 62.

Upon the wall 11 of the box 10, upper and lower grooves 63—63 are provided preferably by forming channels of sheet metal and securing them to the outer surface of the wall; and in these grooves are horizontally slidably mounted plates 64—64 carrying lenses or prisms or the like 65—65. Hand operated means such as knurled heads 66—66 are provided and, in conjunction with other mechanism indicated adjacent to the lenses 65, the lenses or prisms 65 may be rotated adjustably; and the slides 64 may be moved horizontally adjustably. The exact construction of these parts constitutes no essential part of my invention and any well known or suitable mounting for the lenses or prisms 65 such as that indicated in the drawing and which will be recognized from the drawing by those skilled in this art, may be employed.

From the foregoing description, it will now be apparent that the lenses 58—58 and 65—65 may be aligned with the apertures 39 and 40 and with the line of vision of a patient when disposed with his chin resting on the chin rest 60; and that the lenses 58—58 may be disposed substantially in the same position with respect to the patient's eyes as lenses which he might wear in his own spectacles according to an oculist's prescription.

The above described apparatus may be employed in the practice of the method of my invention to correct various ocular defects, among which may be mentioned latent hyperopia, accommodative insufficiency, amblyopia exanopsia, convergence insufficiency, color blindness, and pseudo myopia, etc. etc.

The practice of my invention in cases of hyperopia will first be described. Here the purpose is not to cure the defect known as hyperopia but to effect changes in the eye so that a greater improvement of the vision can be accomplished by spectacles than is otherwise possible.

The patient is first fitted with spectacles for constant wear, the lenses of which have been ground according to prescription to fully correct for both "manifest" and "latent" hyperopia. Such a correction, which of course is ideal if practical, will in most cases "cut back" the vision so that objects which should be clearly seen at a distance of, say, 200 feet, can only be clearly seen when moved up to a distance of not more than 20 feet and then would be seen only with blur.

The patient is then seated at the apparatus, as illustrated in Fig. 1. In this case, the lenses 58—58 may be removed, that is, if the patient is wearing his own spectacles; or if preferred, lenses 58—58 like those of the patient's prescription may be used instead of the patient's own spectacles.

In this case also, the lenses 65—65 are removed, preferably by sliding the slides 64—64 out of their receptacle grooves 63—63. The line of vision of the patient is now through his prescribed lenses and through the apertures 39 and 40 in alignment. An optical screen 70 is placed in the line of vision at a distance of approximately 6 meters and the letters on the screen are reduced in size until they are all blurred out of vision except one and that letter is blurred so that it is just readable.

The optical screen 70 forms no essential part of the present invention and may be any suitable or known commercial type and have associated therewith a projecting apparatus whereby letters of the alphabet may be projected thereupon and increased or diminished in size in the well known manner of such apparatus.

The motor 15 is then started at a suitable rate of speed and the blinder 36 reciprocates up and down periodically completely shutting off the flow of the patient's visual energy. By this means the effort of the brain is periodically interrupted and each time it is resumed it meets a new condition and must adjust itself thereto. As a result of this successive effort and relaxation, the blurred letter becomes clear and the visual acuity is improved to such an extent that the distance is substantially doubled at which optical letters can be read. This result is obtained by successive treatments suitably spaced in time and of suitable duration proportioned to fatigue induced in the patient.

When the treatments are discontinued and after the elapse of a day or two, it will be observed that the visual acuity will drop back or lose some of the improvement but retain most of it, thus giving a permanent improvement and a visual acuity that is better than was possible by any other known method of treatment where the spectacle prescription embodied a full correction.

In treating the eyes for accommodative insufficiency, as associated with myopia, a reading chart is substituted for the chart 70 and placed at a distance of approximately 13 inches from the eyes. The eyes are fitted with spectacles, the lenses of which embody a full myopic correction, or, such lenses are provided at 58—58. Then lenses at 65—65 are added of minus power of five diopters more or less. The lenses 65—65 thus cause the eyes, when the blinder is out of the line of vision, to attempt to accommodate excessively. The blinder is set in motion and the successive periods of effort and relaxation, operating as hereinbefore explained, creates the new brain habit and after two or three treatments, the full accommodative ability remains permanent in the patient's eyes.

In a case of convergence insufficiency, the patient's eyes may otherwise be normal as an illustrative case. Base out prisms are placed at 65—65 and adjusted so that to read letters on a chart 70 at a suitable distance, such as one-third of a meter, an excessive effort to converge is required. The alternate periods of over-exertion and of relaxation caused by the movement of the blinder to clear the line of vision and to obstruct it, instructs the brain in the nature of the effort required and establishes a new brain habit which effects a correction of the insufficiency, which correction remains permanent in the eye.

In treating a case of color blindness, a number of pairs of lenses 58—58, each pair of a different color, such as the well known distinctive colors of the solar spectrum, are provided. In this case, the lenses 58—58 may be planar. The lenses or prisms 65—65 may be omitted. A white and illuminated screen 70 is set up at a suitable distance from the patient's eyes. With one or the other of the colored pairs of lenses in position, the apparatus is started and the vision through the apertures periodically blocked, and the resultant alternation between blindness and vision through the colored lenses excites the retinal receptors of the eye to the point of color reception.

If desired, the excitation may be intensified by brilliantly illuminating the screen 70 or by providing lamps with or without diffusing screens thereover, directing their rays of light toward the eye back along the line of vision.

It will be observed that illustrative treatments are described above which involve either the lenses 58, or both the lenses 58 and the lenses 65, or the lenses 65 alone, or planar lenses 58 respectively.

In view of the marked improvement and in some cases total cure or eradication of ocular defects which may be accomplished by relatively few treatments employing my method and apparatus, it is believed that the method underlying the treatment is distinctly different from prior methods in which the eye is simply constantly exercised. In such prior methods the treatments must be continued over a relatively long period of time until as a result of the continuous constant effort, muscles and other anatomical parts of the eye develop and acquire greater power.

In the method of my invention as will be understood from the foregoing, the underlying principle resides in the utilization of the accommodative and other powers of the eye largely already existent, and in the training or teaching of the brain unconsciously to control these powers.

My invention is not limited to the exact details of construction shown and described inasmuch as many changes and modifications may be made therein without departing from the spirit of the invention or sacrificing its advantages.

I claim:

1. In an apparatus of the class described, a main frame, a support on the frame for supporting a pair of lenses horizontally spaced apart, means on the frame engageable by portions of a patient's head to predeterminedly position his eyes relative to the lenses, an opaque screen blocking off vision of the patient's eyes around the lenses, means providing an aperture in the line of the patient's vision through the lenses, an opaque blind mounted to reciprocate across the line of vision of both of the patient's eyes concurrently to successively cover and then uncover the aperture in each direction of reciprocation, means to continuously reciprocate the blind at a predetermined speed and an optical screen at a predetermined distance behind the opaque screen.

2. In an apparatus of the class described, a main frame, a support on the frame for supporting a pair of lenses horizontally spaced, means on the frame engageable by portions of a patient's head to predeterminedly position his eyes relative to the lenses, an opaque screen blocking off vision of the patient's eyes around the lenses, means providing a pair of apertures spaced apart and aligned with the patient's vision through the lenses, an opaque blind mounted to reciprocate between the apertures across the line of vision of both of the patient's eyes concurrently to successively block off and then unblock the patient's line of vision through the apertures, means to continuously reciprocate the blind at a predetermined speed and an optical screen at a predetermined distance behind the apertures.

3. In an apparatus of the class described, a main frame, a support on the frame for supporting a pair of lenses horizontally spaced, means on the frame engageable by portions of a patient's head to predeterminedly position his eyes relative to the lenses, an opaque screen blocking off vision of the patient's eyes around the lenses, means providing a pair of apertures spaced apart and aligned with the patient's vision through the lenses, an opaque blind mounted to reciprocate between the apertures across the line of vision of both of the patient's eyes concurrently to successively block off and then unblock the patient's line of vision in each direction of reciprocation, means to continuously reciprocate the blind at a predetermined speed and an optical screen at a predetermined distance behind the apertures.

4. In an apparatus of the class described, a main frame, a support on the frame supporting a pair of lenses horizontally spaced apart, means on the frame engageable by portions of a patient's head to predeterminedly position his eyes relative to the lenses, a second support on the frame for supporting a second pair of lenses axially aligned with the first pair, an opaque screen blocking off vision of the patient's eyes around the lenses, means providing a pair of aligned apertures in the line of the patient's vision through the lenses, an opaque blind mounted to reciprocate between the apertures across the line of vision of both eyes of the patient concurrently to successively block off and unblock the line of vision in each direction of reciprocation, means to continuously reciprocate the blind at a predetermined speed and an optical screen at a predetermined distance behind the apertures.

5. In an apparatus of the class described, a main frame, a pair of lenses horizontally spaced apart supported on the frame, an opaque screen disposed to block off vision, except through the lenses, of a patient's eyes aligned therewith, means providing an aperture in the line of vision through the lenses, an opaque blind mounted to reciprocate across the line of vision through both lenses concurrently to successively block off and unblock the line of vision, means to continuously reciprocate the blind at a predetermined speed and an optical screen at a predetermined distance behind the blind.

6. In an apparatus of the class described, a main frame, a pair of lenses horizontally spaced apart supported on the frame, an opaque screen disposed to block off vision except through the lenses, of a patient's eyes aligned therewith, means providing an aperture in the line of vision through the lenses, an opaque blind mounted to reciprocate across the line of vision through both lenses concurrently to successively block off and unblock the line of vision in each direction of reciprocation, means to continuously reciprocate the blind at a predetermined speed and an optical screen at a predetermined distance behind the blind.

LUTE W. WYCKOFF.